(12) United States Patent
Marsden et al.

(10) Patent No.: US 6,394,743 B1
(45) Date of Patent: May 28, 2002

(54) CART FOR MODULE REPLACEMENT

(75) Inventors: Paul R. Marsden, San Diego; David R. Williams, Temecula, both of CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 09/467,454

(22) Filed: Dec. 20, 1999

(51) Int. Cl.⁷ ................................................ B62B 3/04
(52) U.S. Cl. ................. 414/809; 414/331.06; 414/401; 414/495; 414/812; 280/79.3
(58) Field of Search .................. 414/222.07, 222.09, 414/331.06, 331.07, 331.08, 331.09, 331.1, 331.11, 331.14, 396, 400, 401, 495, 809, 812; 254/323, 324, 326; 280/79.3

(56) References Cited

U.S. PATENT DOCUMENTS

| | | |
|---|---|---|
| 861,475 A | 7/1907 | McGill |
| 863,972 A | 8/1907 | Ehlers |
| 924,008 A | 6/1909 | Smith |
| 2,161,578 A * | 6/1939 | Johnson |
| 2,473,659 A | 6/1949 | Musgrave .................... 214/113 |
| 2,524,085 A | 10/1950 | Saul, Jr. ...................... 214/121 |
| 2,582,435 A | 1/1952 | Howard ........................ 280/36 |
| 2,587,688 A | 3/1952 | Bosk ........................... 280/39 |
| 2,672,319 A | 3/1954 | Nelson ........................ 254/148 |
| 2,677,580 A | 5/1954 | Minzenmayer .............. 304/29 |
| 2,786,962 A | 3/1957 | Timpson ....................... 280/36 |
| 2,794,687 A | 6/1957 | Harlan et al. ................... 304/2 |
| 2,828,870 A | 4/1958 | Corley .......................... 214/1 |
| 2,969,220 A | 1/1961 | Spencer ......................... 254/4 |
| 3,191,788 A | 6/1965 | Hopfeld ....................... 214/701 |
| 3,400,942 A | 9/1968 | Hull ............................. 280/39 |
| 3,587,892 A | 6/1971 | Vermette ..................... 214/313 |
| 3,637,095 A | 1/1972 | Kampfer ..................... 214/16.6 |
| 3,659,831 A | 5/1972 | Reber ............................ 266/4 |
| 3,870,126 A | 3/1975 | Himes ......................... 187/8.52 |
| 3,923,167 A | 12/1975 | Blankenbeckler .............. 214/1 |
| 4,084,706 A | 4/1978 | Russell .......................... 214/1 |
| 4,120,411 A | 10/1978 | Johnson ....................... 214/38 |
| 4,337,845 A | 7/1982 | Zelli et al. ..................... 187/17 |
| 4,369,014 A | 1/1983 | Jolivet ......................... 414/11 |
| 4,370,089 A | 1/1983 | Hoster ........................ 414/589 |

(List continued on next page.)

FOREIGN PATENT DOCUMENTS

| | | | |
|---|---|---|---|
| JP | 7-54857 | 6/1995 | ............. H01S/3/03 |
| JP | 2847648 | 11/1998 | ............. H01S/3/03 |

OTHER PUBLICATIONS

C. A. Hurley; Lawerence Livermore Laboratory: "Construction Of A Large Laser Fusion System"; October 25–28, 1977; pp. 1–5; Submission to IEEE Seventh Symposium on Engineering Problems of Fusion Research, Knoxville, Tennessee. (Copy Provided).

Primary Examiner—James W. Keenan
(74) Attorney, Agent, or Firm—John R. Ross, Esq.

(57) ABSTRACT

A cart for the changeout of modules such as a laser chamber module. In one example, the cart includes at least two platforms that are movable with respect to a frame of the cart and that are coupled together such that an upward force for a vertical movement with respect to the frame of one platform provides a vertical movement with respect to the frame of a second platform at an elevated position. The platforms are coupled to each other with chains, wire, or linkage structures. With some carts, the platforms are removable from the rest of the frame. Also with some carts, an upper platform is collapsible on a lower platform. Some carts include two wheel bases that are foldable with respect to one another so as to allow the cart to traverse a surface obstacle by folding one wheel base down over the surface obstacle and transferring a load to that wheel base from another wheel base located on the opposite side of the surface obstacle. Some cart platforms include rail structures that allow a module to be moved from the platform to a system housing such as a laser system housing.

19 Claims, 14 Drawing Sheets

U.S. PATENT DOCUMENTS

| | | | | |
|---|---|---|---|---|
| 4,555,067 A | * | 11/1985 | Angelucci et al. | 414/222.09 |
| 4,604,022 A | | 8/1986 | Bourgraf | 414/340 |
| 4,632,627 A | | 12/1986 | Swallows | 414/490 |
| 4,659,096 A | | 4/1987 | Leimgruber | 280/39 |
| 4,660,787 A | | 4/1987 | Sprenger et al. | 244/118.5 |
| 4,697,974 A | * | 10/1987 | Eltoukhy | 414/331.09 |
| 4,711,407 A | | 12/1987 | Boon | 242/86.52 |
| 4,810,151 A | | 3/1989 | Shern | 414/11 |
| 4,822,069 A | | 4/1989 | Burgess | 280/402 |
| 4,846,484 A | | 7/1989 | Nekola | 280/43.11 |
| 4,846,485 A | | 7/1989 | Payne | 280/47.18 |
| 5,024,576 A | * | 6/1991 | Meschi | 414/331.09 |
| 5,051,056 A | | 9/1991 | Gibbons et al. | 414/678 |
| 5,125,745 A | | 6/1992 | Neiheisel et al. | 356/372 |
| 5,132,510 A | | 7/1992 | Klingel et al. | 219/121.82 |
| 5,181,820 A | | 1/1993 | Sjogren et al. | 414/331 |
| 5,257,892 A | | 11/1993 | Branch | 414/490 |
| 5,305,805 A | | 4/1994 | Watkins, Jr. | 141/231 |
| 5,307,893 A | | 5/1994 | Loehker et al. | 137/899 |
| 5,351,122 A | | 9/1994 | Niebauer et al. | 356/345 |
| 5,356,262 A | | 10/1994 | Babienko et al. | 414/786 |
| 5,415,516 A | | 5/1995 | Richards | 414/458 |
| 5,441,378 A | | 8/1995 | Puls | 414/458 |
| 5,448,856 A | | 9/1995 | Harman | 47/60 |
| 5,449,266 A | | 9/1995 | Evans | 414/458 |
| 5,542,500 A | | 8/1996 | Emrey | 187/273 |
| 5,620,193 A | | 4/1997 | Dschaak | 280/47.13 |
| 5,657,781 A | | 8/1997 | Steverson | 134/144 |
| 5,663,977 A | | 9/1997 | Fujimoto et al. | 372/55 |
| 5,779,428 A | * | 7/1998 | Dyson et al. | 414/401 |
| 5,784,426 A | | 7/1998 | Burner et al. | 376/260 |
| 5,839,876 A | | 11/1998 | McCarthy et al. | 414/590 |
| 5,845,914 A | | 12/1998 | Lenkman | 280/43.17 |
| 6,102,647 A | * | 8/2000 | Yap | 414/495 |
| 6,111,907 A | * | 8/2000 | Ozarski | 372/107 |
| 6,246,905 B1 | * | 6/2001 | Mogul | 607/3 |

* cited by examiner

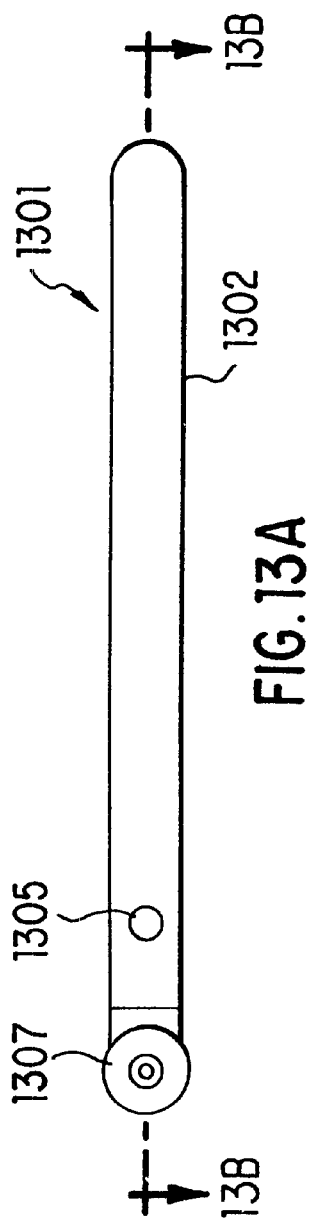
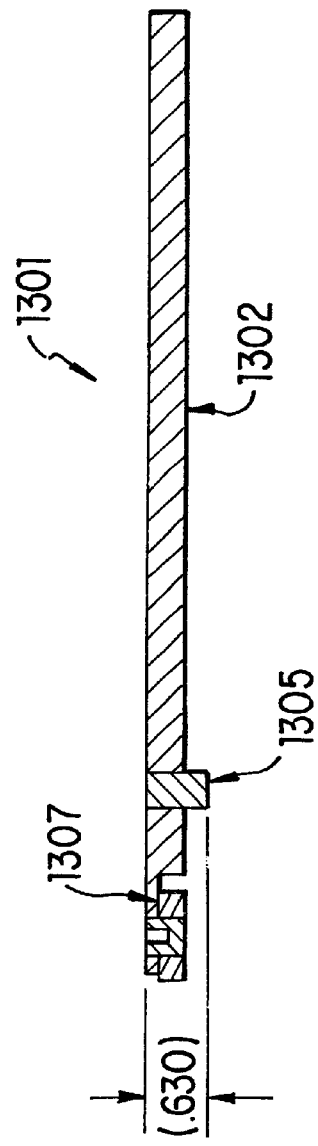
FIG.13A
FIG.13B

CART FOR MODULE REPLACEMENT

BACKGROUND OF THE INVENTION

1. Field of the Invention

This invention relates in general to carts and in particular to carts for the replacement of modules.

2. Description of the Related Art

Gas laser systems, such as excimer lasers, conventionally include a laser chamber or discharge chamber. A mixture of gases (such as halogen, rare gases, helium, and neon) are injected into the chamber and excited by a potential between two electrodes to produce a laser beam.

One problem with such a laser system is that the laser chamber must be serviced regularly. With some laser chambers weighing over 140 pounds, removing the laser chamber from the laser system housing or installing the laser chamber in the housing can be physically challenging for service technicians. In addition, the weight of the chamber may exceed some organizations handling regulations.

Another problem with such a laser system is that changing out an existing laser chamber with a new laser chamber can be cumbersome. Because manufactures desire limiting equipment down time, it is sometimes preferable to install a new laser chamber almost immediately after the old one is removed. However, because the existing laser chamber must be removed before a new chamber can be installed, adequate space for two laser chambers must be available in the vicinity of the laser system housing. Furthermore, unless a cart is capable of handling two laser chambers, the existing chamber would be required to rest on the ground before the new one is installed. Placing a chamber or other laser system module on the ground during a changeout requires the lifting of the existing laser chamber up to the cart to be hauled away.

What is desirable is a system to reduce the manual effort and increase the convenience in installing or removing a laser chamber or other types of laser system modules in a laser system housing.

SUMMARY OF THE INVENTION

A cart is disclosed which advantageously reduces the manual effort in installing or removing a laser chamber from a laser system housing.

In one aspect, the invention includes a method for changing out a laser system module. The method includes removing a first laser system module from a housing to a first platform of a cart at a first elevation and moving the first platform with the first laser system module to a second elevation. The method also includes moving a second platform with a replacement laser system module of the cart to approximately the first elevation and removing the replacement laser system module from the second platform to the housing.

In another aspect, the invention includes a cart for the transportation of laser system modules to or from a laser system housing. The cart includes a frame, a first platform, and a second platform located above the first platform. The first platform is vertically movable with respect to the frame to a first elevation for a transfer of a laser system module between the first platform and the laser system housing. The second platform is vertically movable to the first elevation for a transfer of a laser system module between the second platform and the laser system housing.

In another aspect of the invention, a cart includes a frame, a first platform, and a second platform located above the first platform. The second platform is coupled to the first platform such that an upward force for a vertical movement of the second platform with respect to the frame provides a vertical movement of the first platform with respect to the frame at an elevated position. The first platform is vertically movable with respect to the frame to a first elevation for the placement or removal of objects with respect to the first platform. The second platform is vertically movable to the first elevation for the placement or removal of objects with respect to the second platform.

In another aspect, the invention includes a cart for carrying laser system modules. The cart includes a first wheel base including wheels. The cart is rollable along a surface on the wheels of the first wheel base. The cart includes a second wheel base including wheels. The cart is rollable along a surface on the wheels of the second wheel base. The second wheel base is foldably coupled to the first wheel base. The first and second wheel bases are foldable from an extended position where the wheels of both the first and second wheel base generally reside on the same plane to a folded position where the wheels of the first and second wheel bases do not generally reside on the same plane. In an extended position, a laser system module is movable between the first wheel base and the second wheel base.

In another aspect of the invention, a cart includes a first wheel base including wheels. The cart is rollable along a surface on the wheels of the first wheel base. The cart includes a second wheel base including wheels. The cart is rollable along a surface on the wheels of the second wheel base. The second wheel base is foldably coupled to the first wheel base. The first and second wheel bases are foldable from an extended position where the wheels of both the first and second wheel base generally reside on the same plane to a folded position where the wheels of the first and second wheel bases do not generally reside on the same plane.

In another aspect, the invention includes a method for moving a load on a cart over a surface obstacle. The method includes unfolding a first wheel base from a folded position to an unfolded position with respect to a second wheel base. The second wheel base has wheels residing on a surface on a first side of a surface obstacle. The second wheel base supports a load. In the unfolded position, wheels of the first wheel base reside on a surface on a second side of a surface obstacle opposite the first side. The method also includes moving the load from the second wheel base to be supported by the first wheel base and folding the second wheel base from the unfolded position to a folded position with respect to the first wheel base.

BRIEF DESCRIPTION OF THE DRAWINGS

The present invention may be better understood, and its numerous objects, features, and advantages made apparent to those skilled in the art by referencing the accompanying drawings.

FIG. 13A is a bottom view of an example of an alignment wrench according to the present invention.

FIG. 13B is a side cutaway view of the alignment wrench of FIG. 13A.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
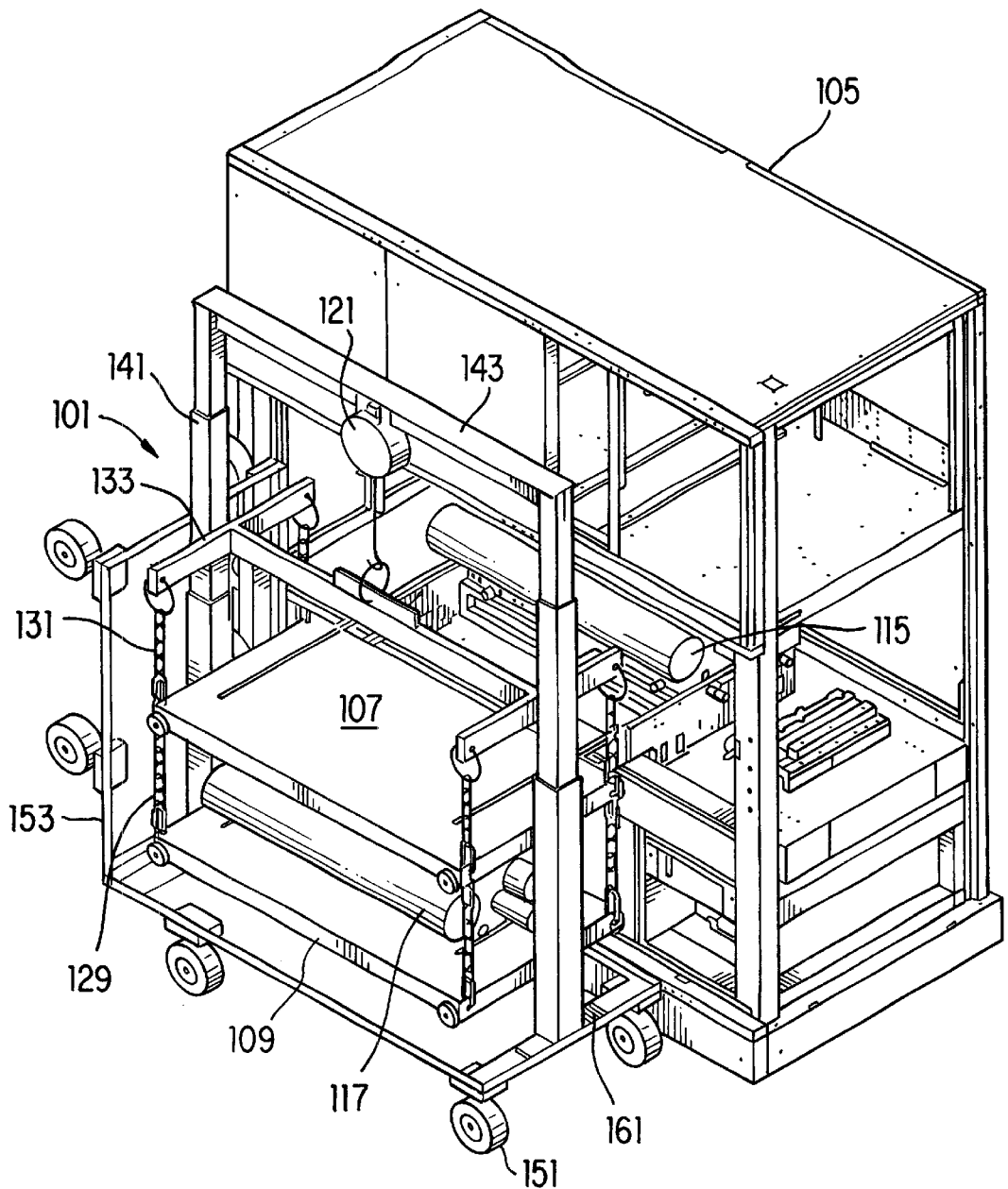
FIG. 1 is a perspective view of an example of a cart and a laser system according to the present invention.

FIG. 1 is a perspective view of an example of a cart according to the present invention. Cart 101 is positioned next to laser system housing 105. Laser system housing 105 houses an excimer laser system that includes a laser chamber module 115. Housing 105 also houses other conventional laser system components such as a high voltage power supply, a laser resonator, a front optical system, a rear optical system, and exhaust and mixing equipment (not shown in FIG. 1). An example of a gas laser system is the ECS 5000 sold by the CYMER, INC.™ of San Diego Calif.

Cart 101 includes two platforms 107 and 109 which enable a changeout of a laser system module such as changing out laser chamber module 115 with laser chamber module 117 (shown in FIG. 1 located on platform 109). Typically, a laser chamber module includes a laser chamber and may include other laser system modules as well such as e.g., a compression head.

To changeout a laser system module, a user positions cart 101 with a replacement module (e.g., laser chamber module 117) supported by platform 109 next to housing 105 (as shown in FIG. 1). After being disconnected from the remaining portion of the laser system, existing laser chamber module 115 is moved from housing 105 to platform 107. Once laser chamber module 115 is supported by platform 107, platforms 107 and 109 are raised by activating hoist 121 to raise platform 109 to the elevation that platform 107 is shown residing in FIG. 1. Replacement laser chamber module 117 is then moved from platform 109 and installed in housing 105. Afterwards, cart 101 is rolled away with laser chamber module 115.

Figure 2:
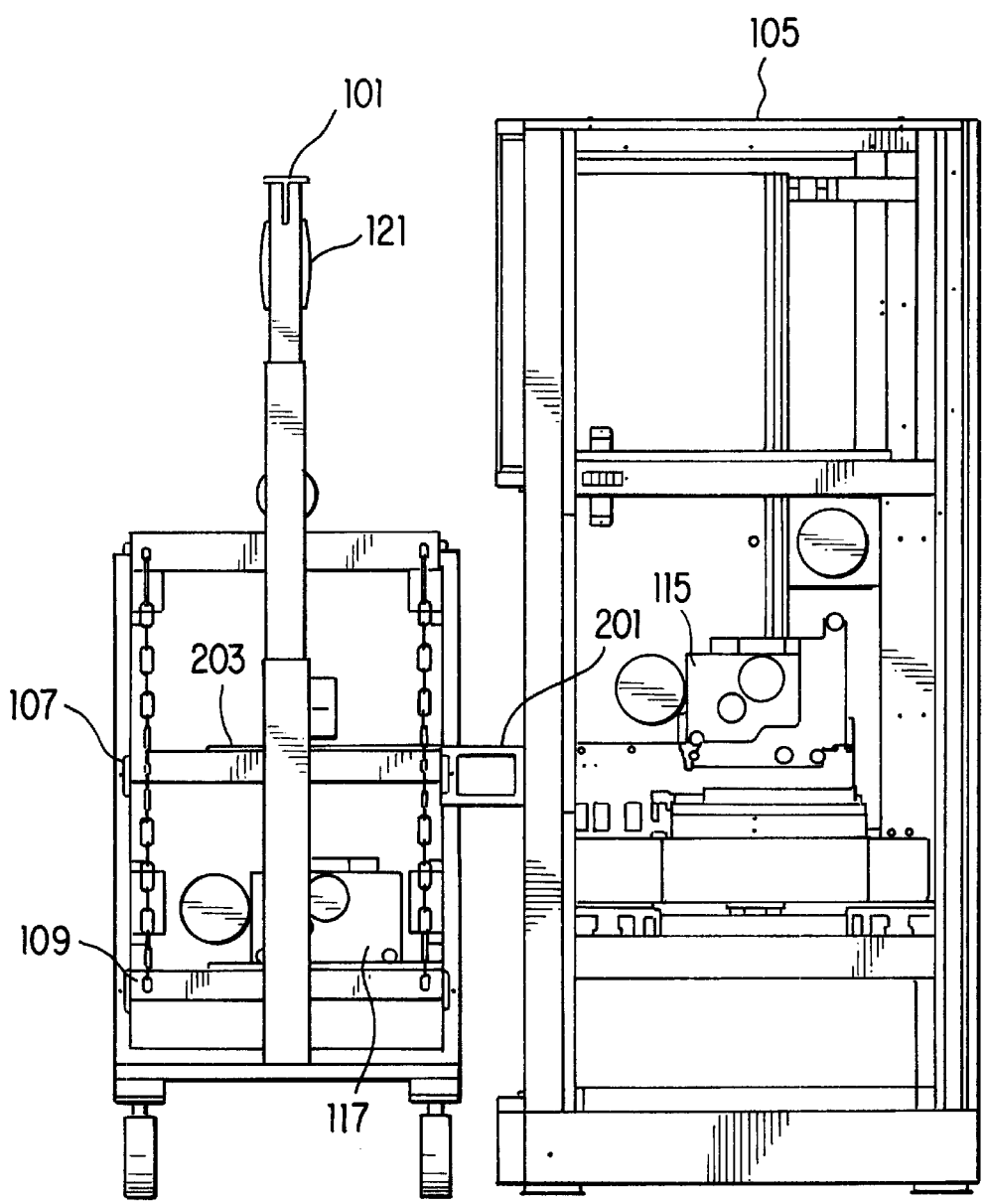
FIG. 2 is a side view of an example of a cart and a laser system according to the present invention.

FIG. 2 shows a side view of cart 101 and laser system housing 105. Attached to platform 107 are extender rails 201 (only one extender rail is shown in FIG. 2). In FIG. 2, extender rails 201 are also attached to laser system housing 105. Extender rails 201 are aligned and positioned with respect to platform rails 203 and housing rails (not shown in FIG. 2) located in laser system housing 105 such that laser chamber module 115 can be moved from laser system housing 105 on the housing rails, over the extender rails 201, and onto rails 203 of platform 107 (and vice versa from platform 107 to laser system housing 105). After chamber 115 is moved to platform 107, the extender rails 201 are detached from platform 107. When platform 109 is raised to the elevation at which platform 107 is shown in FIG. 2, extender rails 201 are attached to platform 109 so that laser chamber module 117 can be moved from platform 109 and installed in housing 115. See FIG. 3 for a close up view of extender rails 201. After laser chamber module 115 has been installed, extender rails 201 are detached from platform 109 and laser system housing 105.

Referring back to FIG. 1, platform 109 is supported from platform 107 by chains 129. Platform 107 is supported from spreader bar 133 by chains 131. Spreader bar 133 is supported from hoist 121. With some embodiments, the platforms may be supported by other types of flexible coupling devices such as, e.g., with stranded wire cable. Supporting the platforms of a cart with flexible coupling devices makes removal of the platforms from the cart easier and also allows the platforms to be collapsed on base 151 when lowered. However, with other embodiments, the platforms are fixably coupled to one another by rigid support devices such as by rigid linkage structures.

Figure 3:
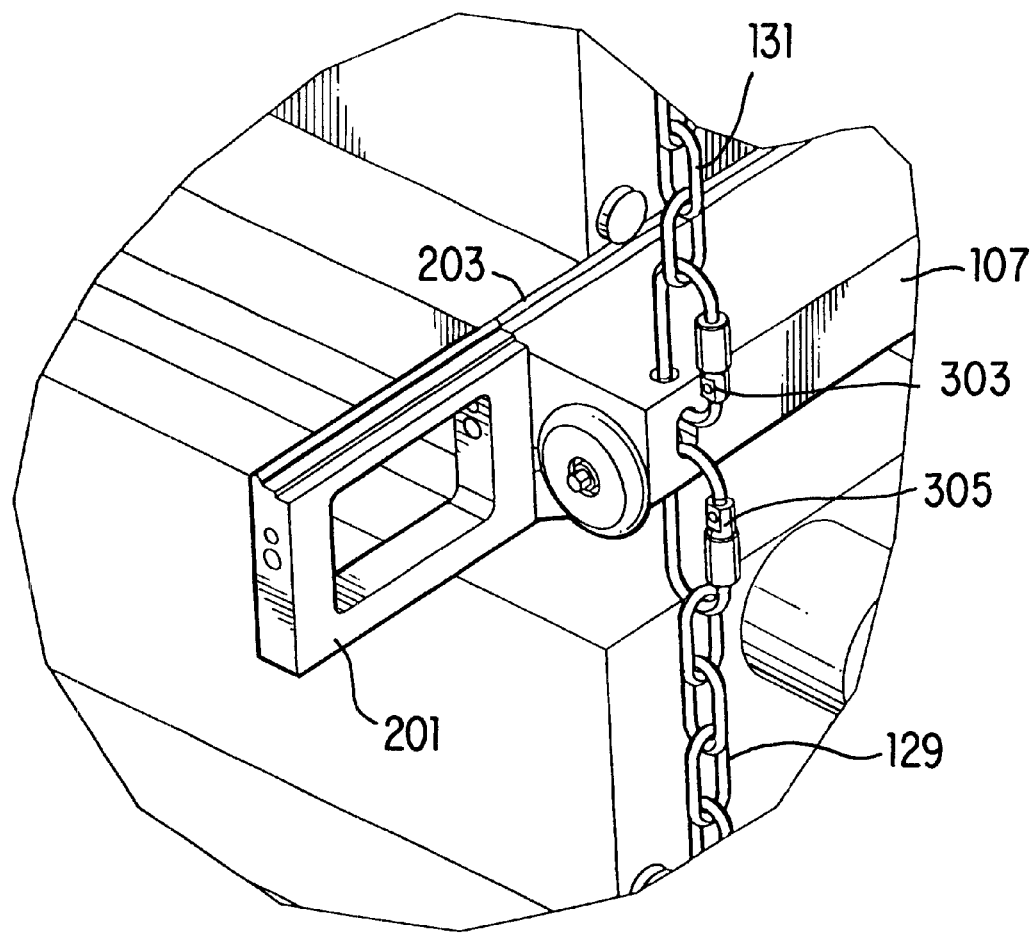
FIG. 3 is a partial perspective view showing an example of a coupling of a coupling device to a platform according to the present invention.

FIG. 3 is a partial perspective view showing a coupling mechanism for coupling a platform to a coupling device. Platform 107 includes holes located generally at the comers of platform 107 for receiving chain connector links 303 which can be unscrewed and opened to allow platform 107 to be uncoupled from chain 131. Likewise chain link 305 can be opened to allow chain 129 to be uncoupled from platform 107 thereby allowing platform 109 (not shown in FIG. 3) to be removed from cart 101.

Figure 4:
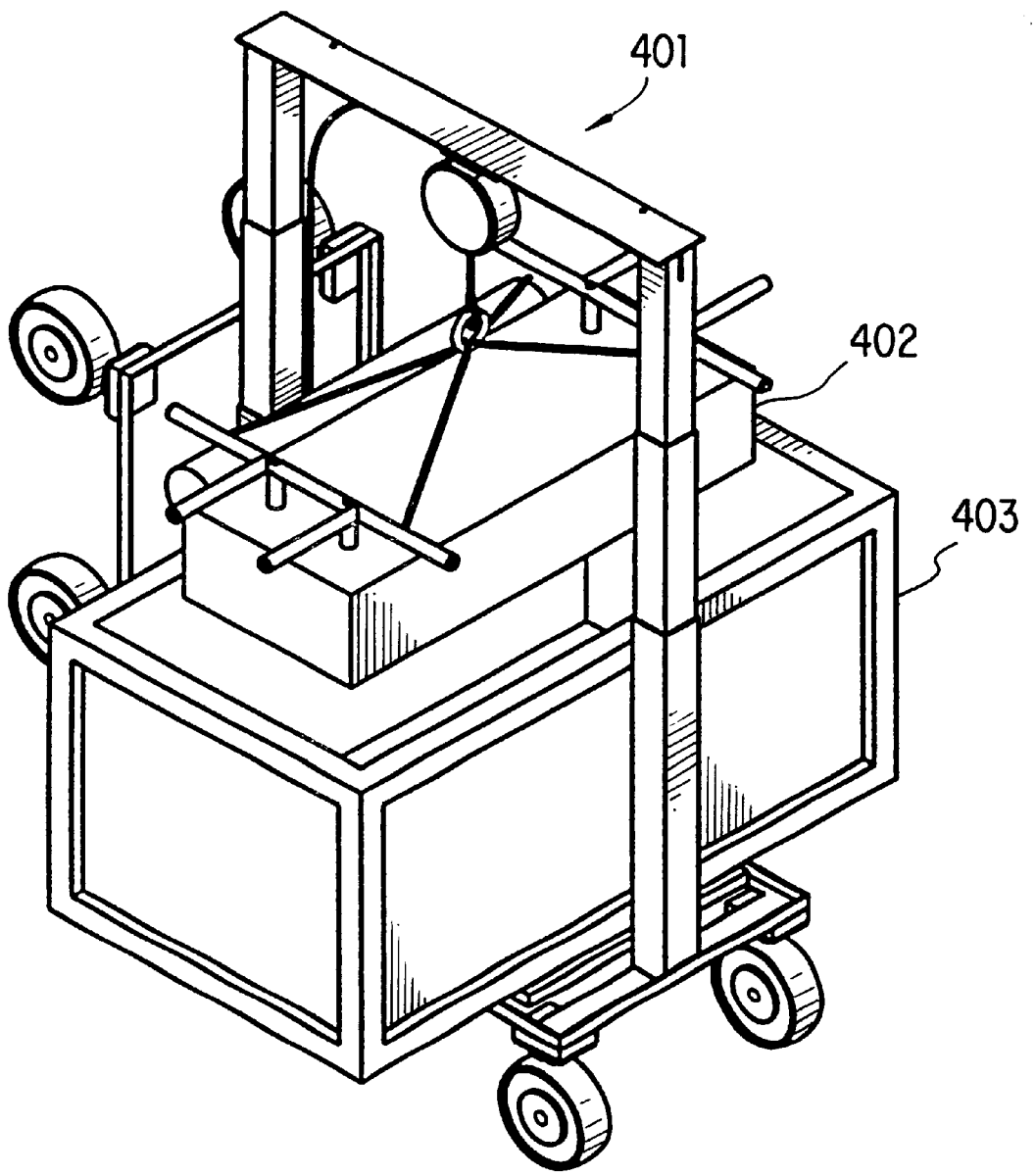
FIG. 4 is a perspective view of an example of a cart according to the present invention.

Referring to FIG. 4, providing a cart with removable platforms enables some or all of the platforms to be removed so that the cart can be used to transport other items. FIG. 4 shows cart 401 being utilized to lift an object 402 out of a shipping crate 403.

Figure 5:
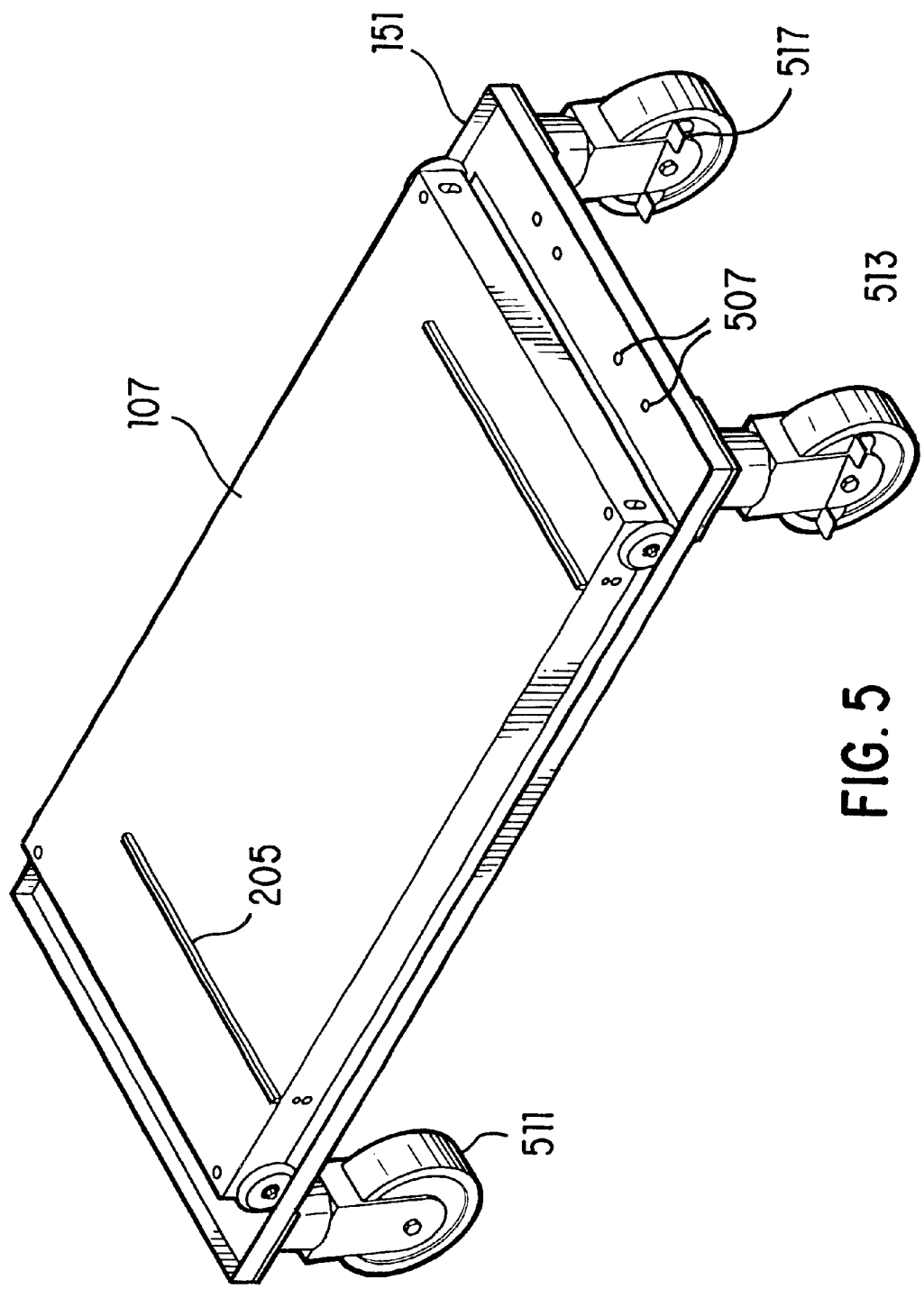
FIG. 5 is a perspective view of an example of a base of a cart with a platform being supported on the base according to the present invention.

Referring to FIG. 5, another advantage of providing a cart with removable platforms is that either platform (e.g., 107 or 109) can be brought to rest on the base of the cart. Allowing either platform to rest on a cart base provides more stability in moving the cart with a loaded platform. In FIG. 5, platform 107 is shown resting on base 151. Referring back to FIG. 1, after laser chamber module 115 is moved to platform 107 and after laser chamber module 117 is installed, empty platform 109 can be removed from cart 101 by unscrewing the open chain links (e.g., 305) at the top of chains 129 and decoupling chains 129 from platform 107. Platform 107 (supporting laser chamber module 115) can be lowered down to be supported by base 151. Cart 101 can then be moved with the weight of laser chamber module 115 being supported on base 151. Lowering a laser system module to be supported by a cart base not only provides more stability to the module during the movement of the cart but it also lowers the center of gravity of the cart.

Referring back to FIG. 1, hoist 121 is mounted to cross beam 143 which is supported by two poles 141 mounted to base 151. With other carts, other types of lifting devices (e.g., winch or hydraulic cylinder) may be utilized to provide a lifting force on the platforms. In one embodiment, hoist 121 (or other lifting device) is electrically activated. With other embodiments, the lifting device is operated by hand.

Poles 141 are adjustable in height. In one embodiment, the adjustable height poles include spring-loaded locking pins for allowing the poles to be set at various heights. At the base of each pole 141 is a bracket 161 that is bolted to base 151 to attach pole 141 to base 151. Shown in FIG. 5 are bolt holes 507 that receive the bolts for mounting poles 141.

Base 151 is supported by casters 511 and 513 with casters 513 each having a locking brake 517 for locking the wheels of casters 513 in place.

Referring back to FIG. 1, cart 101 includes a second wheel base 153 that is shown in FIG. 1 in a folded position with respect to wheel base 151. One advantage of providing cart 101 with two wheel bases is that it allows cart 101 to traverse floor obstacles with out the load of the cart having to change elevation.

Figure 6:
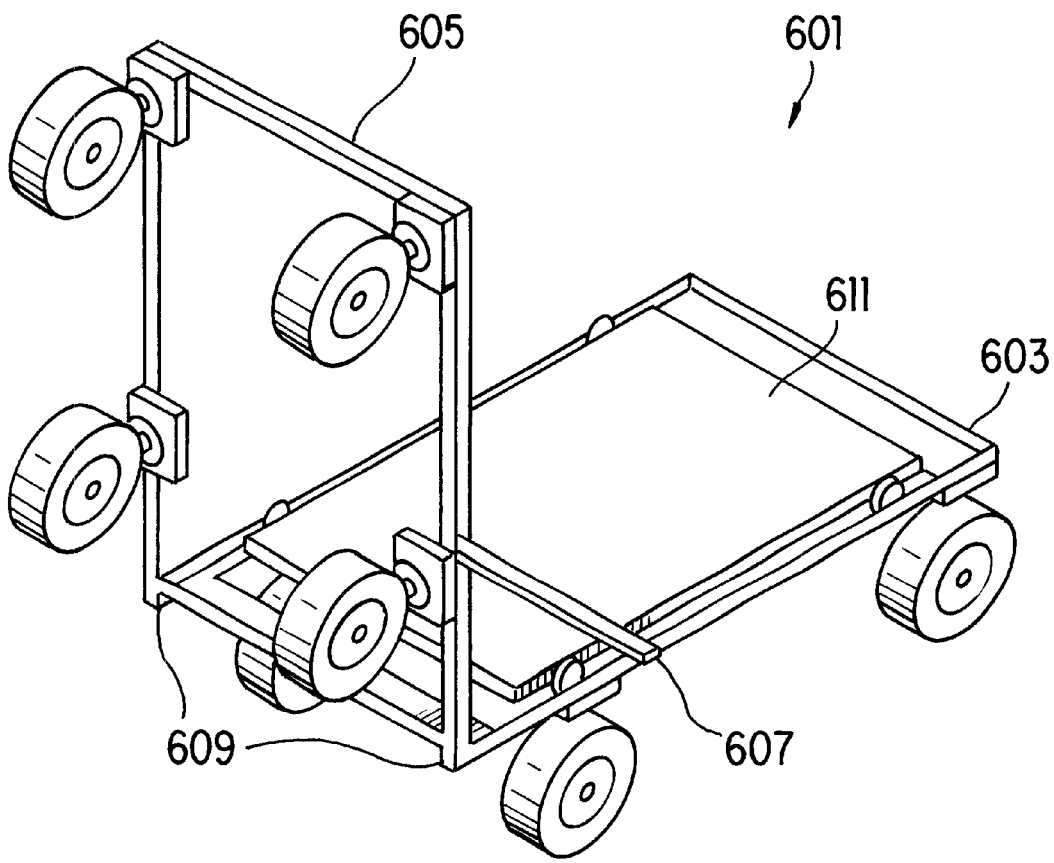
FIG. 6 is a perspective view of an example of a cart with a first wheel base foldably coupled to a second wheel base according to the present invention.

FIG. 6 shows a perspective view of an example of a cart having two wheel bases. Wheel base 605 is shown in a folded position with respect to wheel base 603. Cart 601 also includes a brace 607 for securing wheel base 605 in the folded position. Platform 611 is shown being supported by wheel base 603. Wheel base 603 is coupled to wheel base 605 via hinges 609.

Figure 7A:
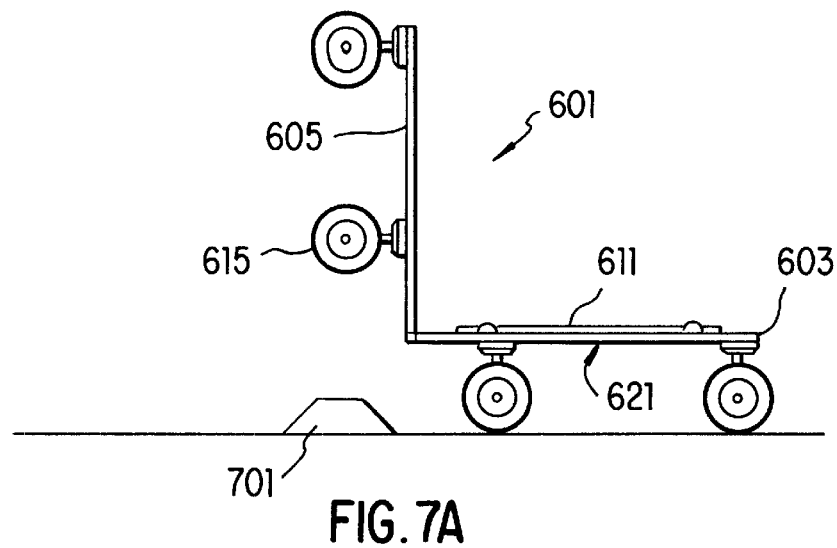
FIGS. 7A–7C are sides views of an example of a cart at various stages in traversing a surface obstacle according to the present invention.
Figure 7B:
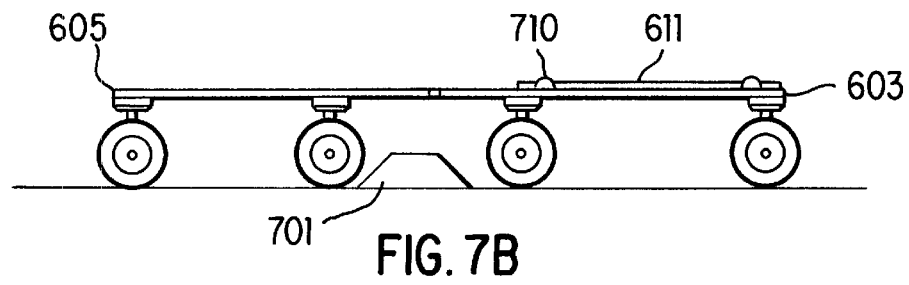
Figure 7C:
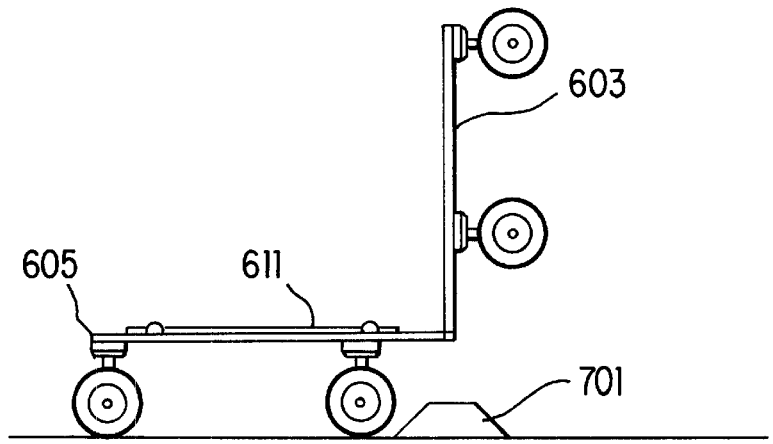

FIGS. 7A–7C show side views of cart 601 at various stages in traversing a surface obstacle. Examples of surface obstacles include pipes or cords located on the floor of a manufacturing area. In FIG. 7A, cart 601 is shown on the right side of surface obstacle 701 with wheel base 605 in a folded position and with wheel base 603 supporting platform 611. To traverse surface obstacle 701 with cart 601, a user would push cart 601 to its position shown in FIG. 7A. The user would then decouple brace 607 (not shown in FIG. 7A–7C) from one of the wheel bases (either 603 or 605) and unfold wheel base 605 to an unfolded or extended position shown in FIG. 7B with the wheels of wheel base 605 positioned on the left side of surface obstacle 701. A user would then move platform 611 on its wheels 710 from wheel base 603 to wheel base 605. Afterwards, the user would fold wheel base 603 to an upright position as shown in FIG. 7C. After reattaching brace 607 to both wheel bases, the user would move cart 601 away from surface obstacle 701 with platform 611 located on wheel base 605. With some embodiments where platform 611 does not include wheels, cart 611 would be slid from wheel base 603 to wheel base 605.

Referring back to FIG. 7A, when wheel base 605 is in the folded position, it is preferable that wheels 615 be located above the bottom side of base frame 621 to provide cart 601 with the maximum clearance over a surface obstacle (e.g., 701). However, with other utility carts, the wheels may be located at lower elevations when a wheel base is in a folded position. In one embodiment, the cart is designed to traverse a surface pipe having a 6" diameter.

Figure 8:
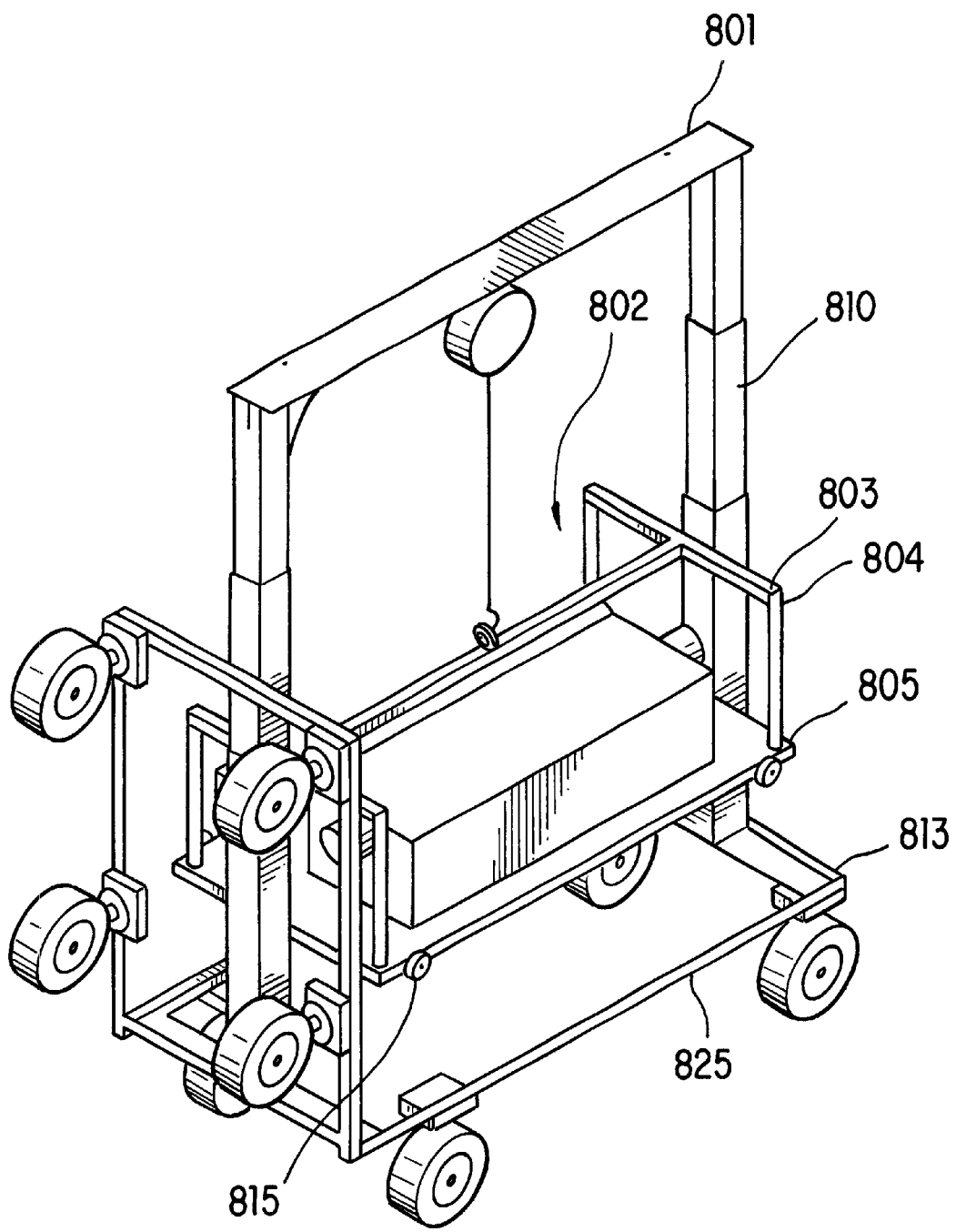
FIG. 8 is a perspective view of an example of a cart according to the present invention.

FIG. 8 shows another example of a cart according to the present invention. Platform 802 includes legs 804 that are attached to platform base 805 and to spreader bar 803. A second platform (not shown) may be attached to platform base 805. Poles 810 can be removed from wheel base 813 to allow platform 802 to be rolled to unfolded wheel base 815.

Those of skill in the art will recognize that, based upon the teachings herein, cart 801 may be modified such that wheels bases 813 and 815 are coupled to each other along their long end sides (such as along side 825 of wheel base 813). In these embodiments, removal of the poles is not required to move the platform between the wheel bases in an unfolded position. Also, with some embodiments, both wheel bases may include bolt hole patterns that allow poles (e.g., 810) to be mounted on both wheel bases in an unfolded position so as to double the carrying area of the cart. With other embodiments, each wheel base includes a set of bolt holes such that poles can be attached to either wheel base.

Figure 9:
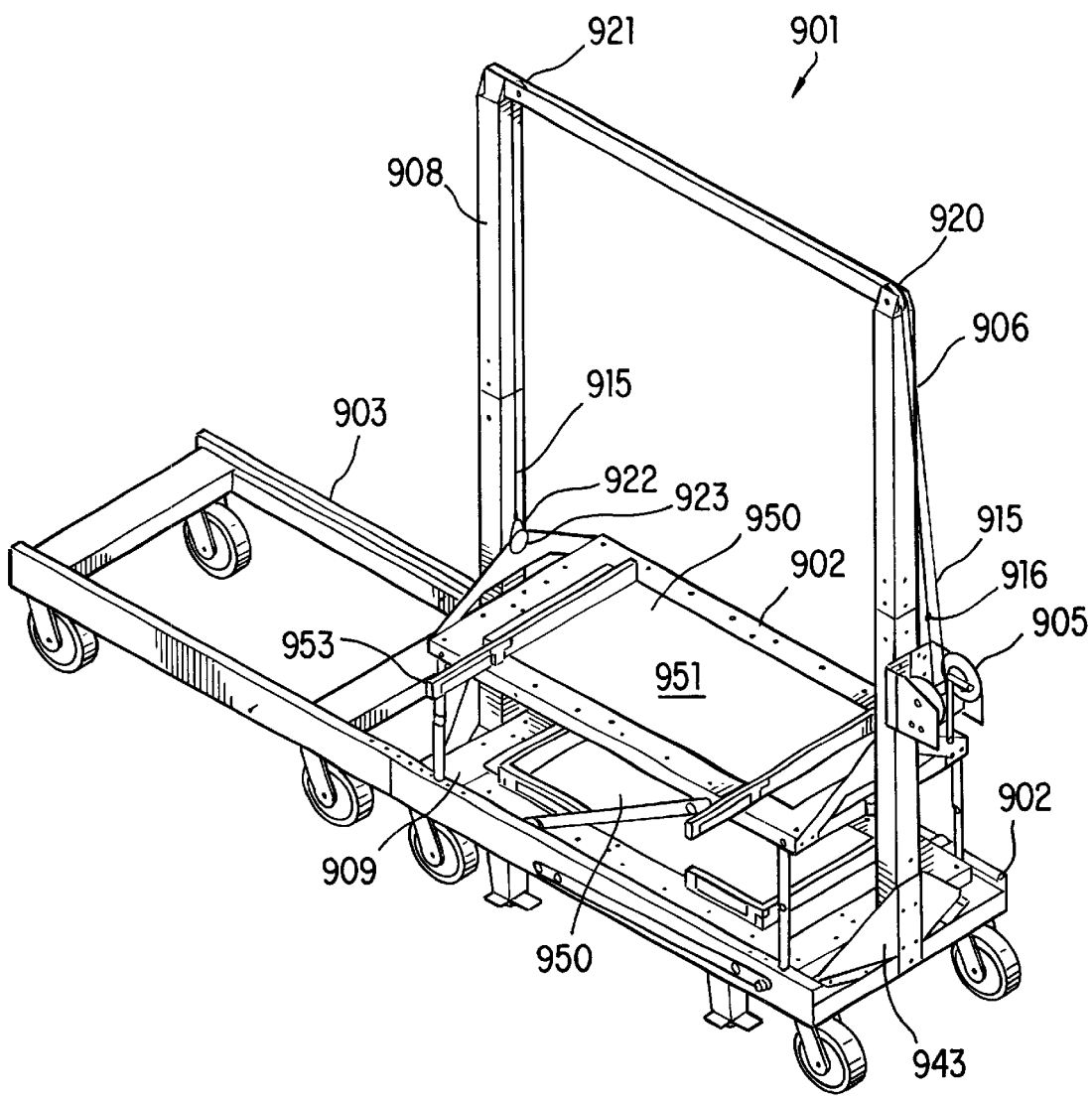
FIG. 9 is a perspective view of an example a cart according to the present invention.

FIG. 9 shows a perspective view of another example of a cart according to the present invention. Cart 901 is shown with a second wheel base 903 in an extended or unfolded position with respect to wheel base 902. Cart 901 includes a hand winch located on the side of pole 906. Hand winch 905 is used to provide an upward force on platforms via winch lines 915 and 916. Winch line 915 runs through pulley 921 and one side of double pulley 920. Winch line 916 runs through the other side of pulley 920. Winch lines 915 and 916 end in loops (with loop 922 shown in FIG. 9) that are located around knobs (with knob 923 shown in FIG. 9) to couple platforms 907 and 909 to winch lines 915 and 916.

Figure 10:
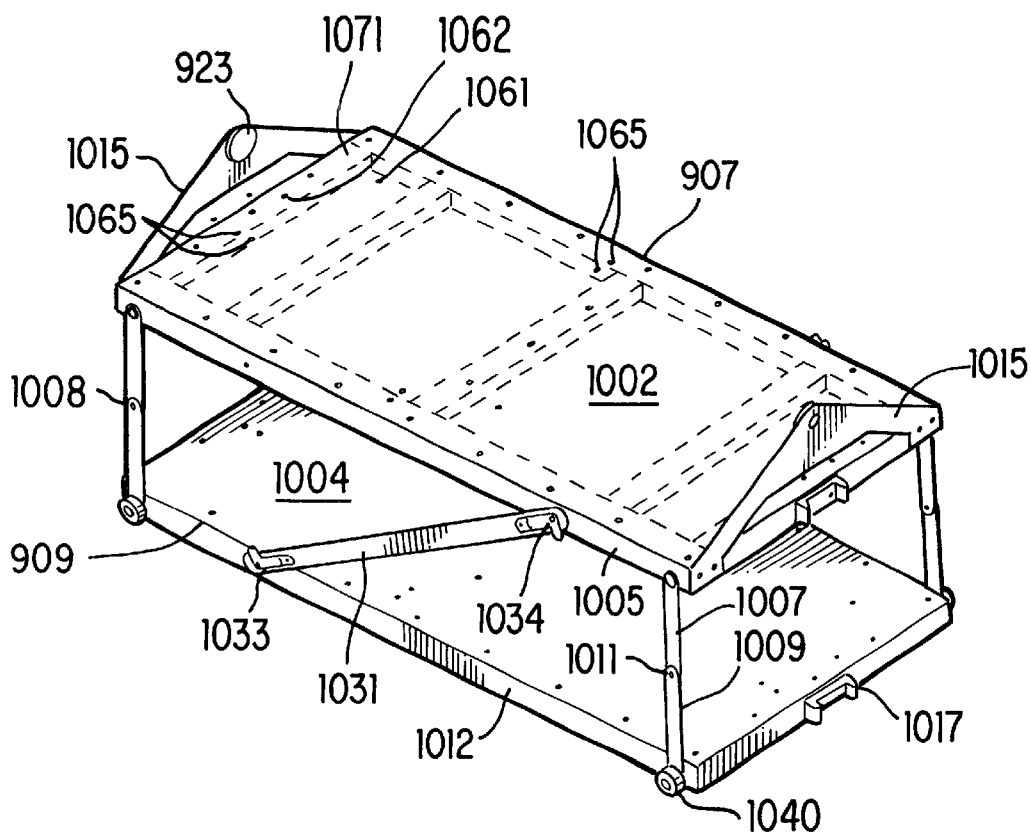
FIG. 10 is a perspective view of an example of cart platforms according to the present invention.

FIG. 10 is a perspective view of portions of platform 907 and 909. Platform 907 includes a platform cover plate 1002 attached (e.g., by screws) to platform frame 1005. In one embodiment, cover plate 1002 is a 0.25" thick plate made of a durable material having a relatively low coefficient of friction such as e.g., black delrin acetal plastic or other similar material. Portions of platform frame 1005 are shown in phantom in FIG. 10. In one embodiment, the studs of frame 1005 are hollow studs measuring 1.38"×1.69" and have 0.125" thick walls made of a 6061-T6 aluminum alloy. Lifting brackets 1015 are attached to platform frame 1005 and include knobs 923. Platform 909 includes a platform cover plate 1004 attached to a platform frame 1012. Attached to each end of platform frames 1005 and 1012 are guide brackets 1017 that reside around poles 906 and 908 to stabilized platforms 907 and 909 when being raised and lowered (See FIG. 9).

Platform frame 1005 is coupled to platform frame 1012 via four linkage structures 1008 that are generally located at the corners of the platform frames. Each linkage structure 1008 includes an upper link 1007 rotatably attached to platform frame 1005 and a lower link 1009 rotatably attached to platform frame 1012 via the attachment of a wheel 1040 to platform frame 1012. In one embodiment, each pair of wheels 1040 located at an end of platform 909 are mounted on a shaft that extends through holes in lower links 1009 and underneath platform cover 1004. Upper link 1007 is rotatably coupled to lower link 1009 via a pin structure 1011. In one embodiment, pin structure 1011 is removable to enable platform 907 to be decoupled from platform 909. In other embodiments, platform 907 may also include wheels.

Upper platform 907 is also coupled to platform 909 via two support brackets coupled to each side of platform frames 1005 and 1012 (support bracket 1031 is shown in FIG. 10). Support bracket 1031 includes a latch bracket 1033 at each end which secures support bracket 1031 to support pins 1034 attached to the platform frames to securely couple support bracket 1031 to platforms 907 and 909 and yet allow support bracket 1031 to be decoupled from either platform. Support bracket 1031 provides a force to prevent the ends of platforms 907 and 909 from moving in opposite directions away from each other along their lengths. In one embodiment, the latch brackets 1033 located at the ends of support bracket 1031 are movable by approximately 5 degrees from the assembly arm of support bracket 1031 to allow for of support bracket 1031 to be coupled and decoupled from a support pin 1034 attached to a platform frame.

Because lower links 1009 are rotatably coupled to upper links 1007, decoupling the support brackets 1031 from one of the platforms allows platform 907 to be collapsed onto platform 909. Providing a utility cart with an upper platform that is collapsible advantageously allows for a load on the upper cart to be supported by the base of the cart. For example, referring back to FIG. 1, once replacement laser chamber 117 is installed in housing 105, platform 109 (which is empty) can be lowered onto base 151 and then platform 107 (loaded with laser chamber module 115) can be lowered onto platform 109. Consequently, laser chamber module 115 can be supported by wheel base 151 during transport away from laser system housing 105. Referring back to FIG. 9, in some embodiments, bottom platform 909 includes spacer blocks (not shown) located at each corner on top of cover plate 1004. In these embodiments, platform 907 would rest on the spacer blocks when collapsed onto platform 909.

Figure 11:
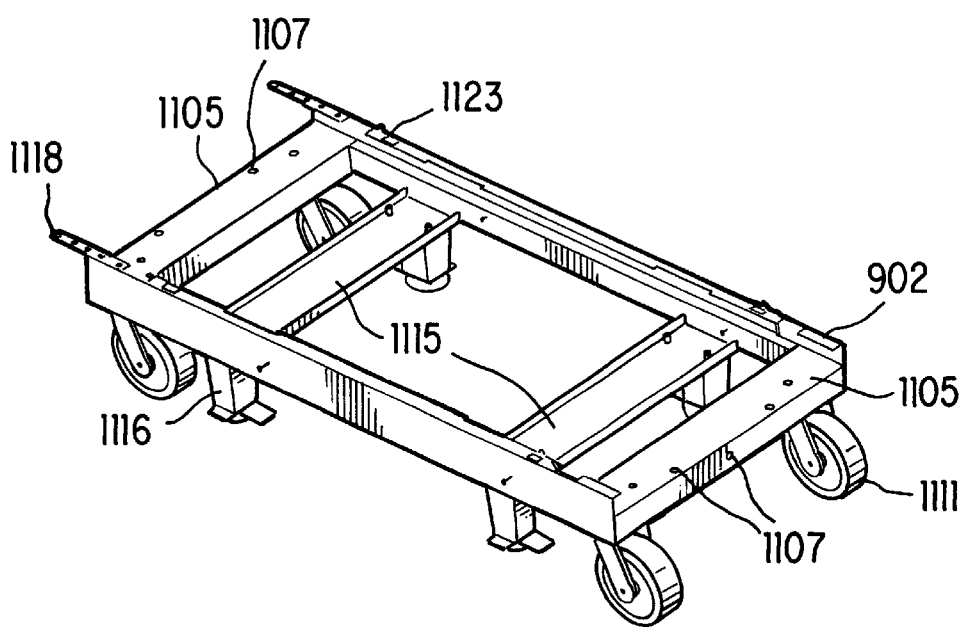
FIG. 11 is a perspective view of an example of a portion of a base of a cart according to the present invention.

FIG. 11 is a perceptive view of wheel base 902. Wheel base 902 includes two end studs 1105 each having bolt holes for receiving bolts for mounting brackets 943 to end studs 1105. Referring back to FIG. 9, poles 908 and 906 are each attached to a bracket 943 to secure poles 908 and 906 to wheel base 902. Referring back to FIG. 11, in one embodiment, end studs 1105 are hollow studs measuring 2"×4" and having 0.125" thick walls of 6061-T6 aluminum alloy. Casters 1111 are bolted to the underside of end studs 1105.

Wheel base 902 also includes C channel studs 1115. Attached to studs 1115 are floor jacks 1116 for securing cart 901 to a position on a surface. Also attached to base 902 are quick release pins 1123 to prevent platform 909 from undesirably rolling with respect to wheel base 902. Wheel base 902 is foldably coupled to wheel base 903 (not shown in FIG. 11) via hinges 1118.

Referring back to FIG. 9, platforms 907 and 909 each include a module transfer assembly 950 located on top of its cover plate (1002 and 1004). Module transfer assemblies 950 each include rail structures 953 attached to a transfer fixture 951 that allows the rail structures 953 to be easily aligned with rails (not shown) of a laser system housing. In FIG. 9, the transfer fixture is a sliding plate 951 that is slidable on its respective cover plate (1002 and 1004, respectively).

Figure 12A:
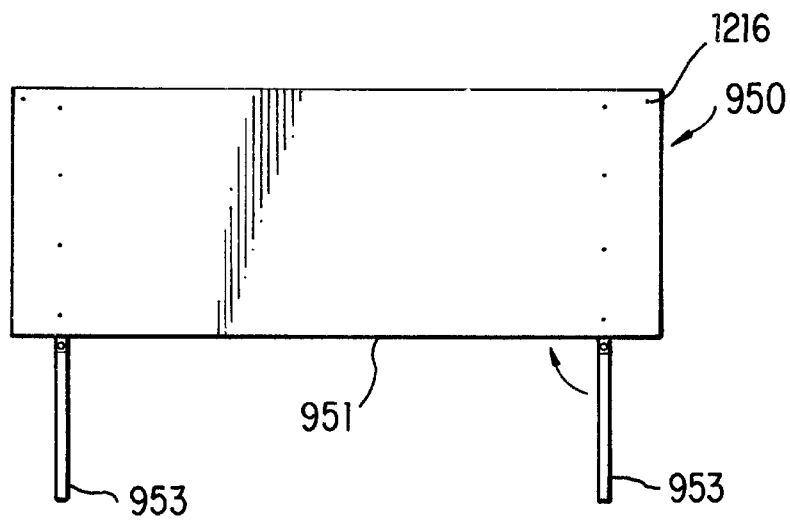
FIGS. 12A and 12B are views of an example of a sliding plate with attached rail structure according to the present invention.
Figure 12B:
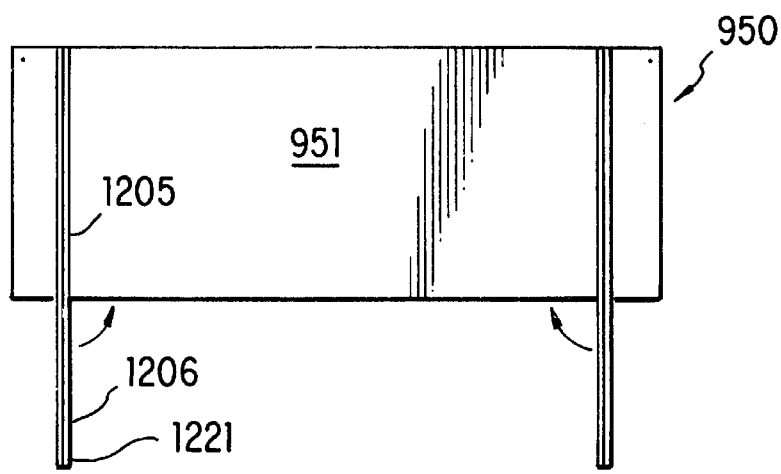
Figure 12C:
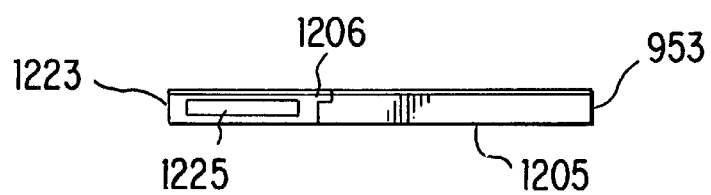
FIG. 12C is a side view of an example of a rail structure according to the present invention.

FIG. 12A shows a bottom view of module transfer assembly 950. FIG. 12B shows a top view of module transfer assembly 950. FIG. 12C shows a side view of rail structure 953. Rail structure 953 includes a first portion 1205 fixably attached to sliding plate 951. The second portion 1206 of rail structure 953 is attached to portion 1205 via a hinge to allow second portion 1206 to rotate between a retracted position (such as the position of the rail structures for module transfer assembly 950 of platform 909 in FIG. 9) to an extended position such as that shown in FIGS. 12A and 12B. Thus, portion 1206 can be retracted when not in use. Located on the top side of each rail structure 953 is a ridge 1221 that in one embodiment, has a 90 degree V angle. Referring to FIG. 12C, bolt holes 1223 extend from the open portion 1225 of portion 1206 to the left end of portion 1206 (relative to the view shown in FIG. 12C). Bolt holes 1223 receive bolts for attaching portion 1206 to the laser system housing. In one embodiment, sliding plate is a 0.13" aluminum alloy plate and rail portions 1205 and 1206 are solid filled and made of an aluminum alloy.

Sliding plate 951 includes two holes 1216 for receiving pins (not shown) to fixably secure module transfer assembly 950 to its respective cover plate. Referring back to FIG. 10, top and bottom plate 1002 and 1004 each includes holes 1061 and 1062 for receiving the securing pin to secure sliding plate 951. Pin hole 1062 is located above a corresponding pin hole (not shown) in the end stud (end stud 1071 shown in phantom) of platform frame 1005 such that a pin inserted into hole 1062 could also be inserted into the hole in the end stud to secure module transfer assembly 950 to platform frame 1005.

FIG. 13A is a bottom view of an alignment wrench 1301 according to the present invention and FIG. 13B is a cutaway view of an alignment wrench 1301. Alignment wrench 1301 is utilized to slide module transfer assembly 950 with respect to a cover plate (1002 or 1004). Wrench 1301 includes a handle 1302, a pivot pin 1305, and a wheel 1307 rotatably coupled to handle 1302.

Figure 14:
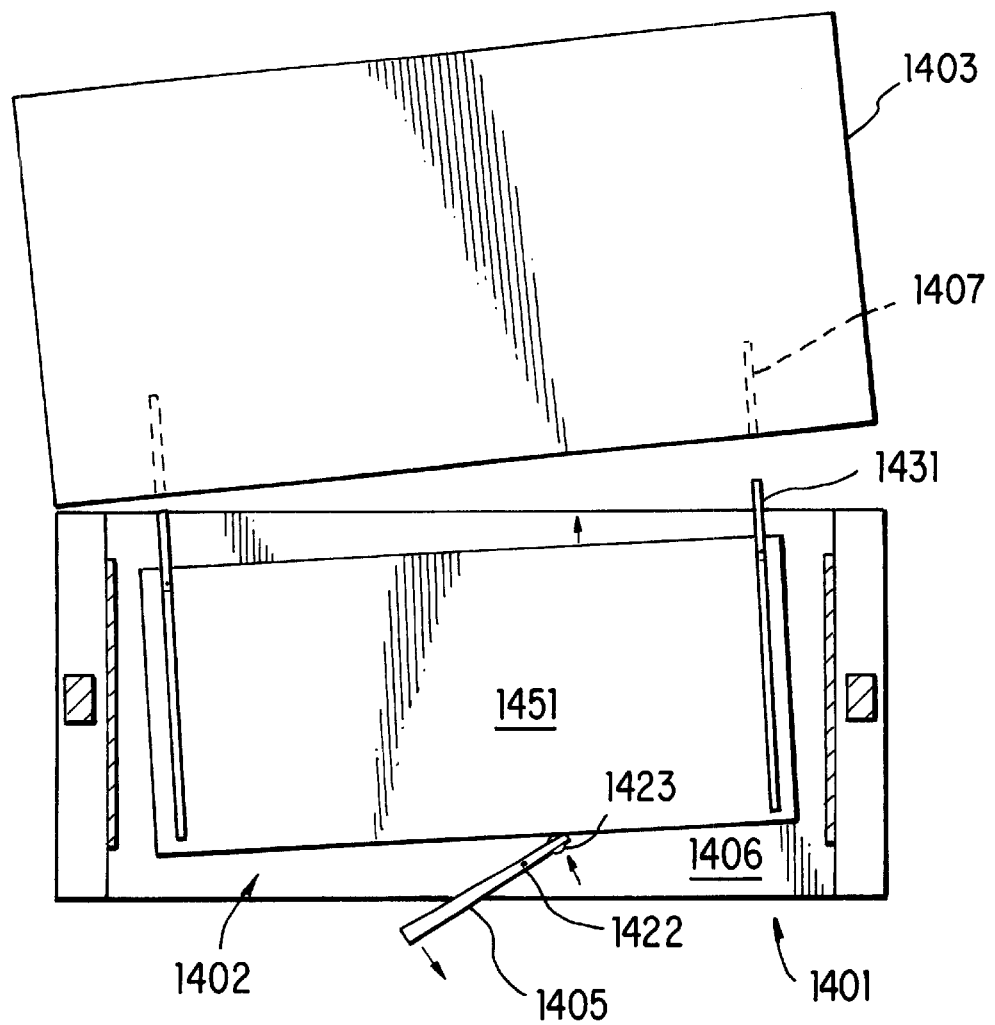
FIG. 14 is a top cutaway view of an example of a laser system housing and cart according to the present invention.

FIG. 14 is a cutaway top view of a cart and a laser system housing according to the present invention. Cart 1401 is shown next to laser system housing 1403 at an angle. Alignment wrench 1405 is shown with pivot pin 1422 inserted into a hole in cover plate 1406 of platform 1402. Movement of the handle 1405 in a first direction rotates wheel 1423 in the opposition direction to move sliding plate 1451 so as to align rail structures 1431 with housing rails 1407. When a module (not shown) has been moved onto rail structures 1431 from system housing 1403, alignment wrench 1405 is used to move sliding plate 1451, rail structures 1431, and the laser module to a generally centered position on platform 1402 for the removal of cart 1401 from housing 1401. In those embodiments having a cover plate made of black delrin or other similar material, the relatively low friction coefficient of the cover plate material enables to the sliding plate to be slid more easily over the cover plate.

Figure 15:
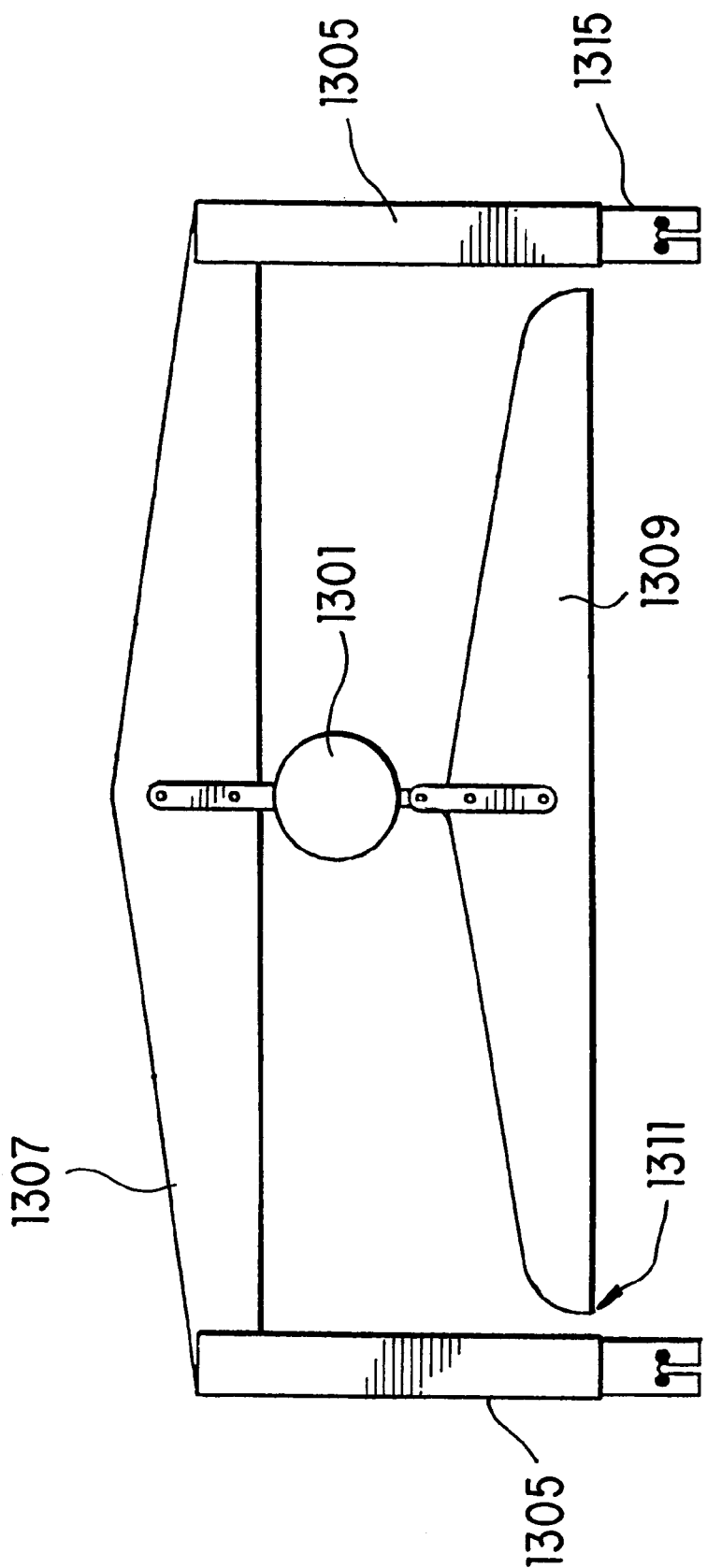
FIG. 15 is a side view of an example of a top portion of a cart according to the present invention.

FIG. 15 is a side view of an alternative top portion of utility cart 901. A chain hoist 1501 is attached to a top plate 1507. A spreader 1509 hangs from chain hoist. The cart platforms (not shown in FIG. 15) are supported from spreader 1509. The end portions of top plate 1507 reside in slots at the top of upper pole sections 1505. The bottom portions 1515 of upper pole section 1505 are inserted into lower pole sections (not shown in FIG. 15) of poles 906 and 908. In some embodiments, the end portions 1511 of spreader 1509 each include grooves for receiving braided wire cables that supports the platforms. In one embodiment, spreader 1509 and top plate 1507 are 0.5" thick and made from 6061-T6 aluminum alloy.

Those of skill in the art will recognize that, based upon the teachings herein, several modifications may be made to the embodiments shown in FIGS. 1–15 and described herein. For example, carts shown or described herein may be used in the changeout of other excimer laser system modules or modules for other types of laser systems, as well as for the changeout of modules for other types of equipment. An excimer laser system module may include e.g., one or more of: a voltage power supply, a laser resonator, a front optical system, a rear optical system, exhaust and mixing equipment, compressor head or other type of excimer laser system component. Also portions of the wheel bases, poles, and platforms may be made of other material such as, e.g., galvanized steel and may have other configurations. Furthermore, a cart may include more than two platforms.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for changing out a laser system module comprising:

removing a first laser system module from a housing to a first platform of a cart at a first elevation;

moving the first platform with the first laser system module to a second elevation;

moving a second platform of the cart with a replacement laser system module to approximately the first elevation;

removing the replacement laser system module from the second platform to the housing.

2. The method of claim 1 further comprising:

moving the cart to the housing with the replacement laser system module on the second platform supported on a base of the cart at a base elevation;

wherein moving the second platform with the replacement laser system module to approximately the first elevation includes elevating the second platform to approximately the first elevation from the base elevation.

3. The method of claim 1 further comprising:

coupling the first platform to the housing prior to the removing the first laser system module from the housing;

uncoupling the first platform from the housing after the removing the first laser system module from the housing;

coupling the second platform to the housing prior to the removing the replacement laser system module from the second platform; and uncoupling the second platform from the housing after the removing the replacement laser system module from the second platform.

4. The method of claim 1 further wherein the moving the first platform with the first laser system module to the second elevation is performed concurrently with the moving the second platform with the replacement laser system module to approximately the first elevation.

5. The method of claim 4 wherein the moving the first platform with the first laser system module to the second elevation and the moving the second platform with the replacement laser system module to approximately the first elevation further include activating a lifting device to provide a force for the movement of the platforms.

6. The method of claim 1 wherein the first platform is coupled to a spreader of the cart, wherein a lifting device elevates the spreader to elevate the first platform.

7. The method of claim 1 further comprising:

coupling the second platform to the first platform to enable the second platform to be supported from the first platform during an elevation of the first platform.

8. The method of claim 1 further comprising:

lowering the first platform with the first laser system module to where the weight of the first platform is supported by a base of the cart.

9. The method of claim 8 further comprising removing the cart with the first laser system module from the housing with the weight of the first platform supported by the base of the cart.

10. The method of claim 8 further comprising:

removing the second platform from the cart prior to the lowering the first platform with the first laser system module to where the weight of the first platform is supported by the base of the cart.

11. The method of claim 8 wherein the lowering the first platform with the first laser system module to where the weight of the first platform is supported by the base of the cart further includes:

lowering the second platform to where the weight of the second platform is supported by the base of the cart;

lowering the first platform to where the weight of the first platform is supported by the second platform.

12. The method of claim 1 wherein the first laser system module and the replacement laser system module each include a laser chamber.

13. The method of claim 1 further comprising:

collapsing the first platform onto the second platform after the removing the replacement laser system module from the second platform to the housing.

14. The method of claim 1 further comprising:

aligning rail structures of the second platform with rail structures of the laser system housing;

wherein the removing the replacement laser system module further includes moving the replacement laser system module on the rail structures of the second platform and on the rail structures of the laser system housing.

15. The method of claim 14 wherein the aligning rail structures of the second platform further includes:

moving at least a portion of the rail structures from a retracted position to an extended position.

16. The method of claim 14 wherein the aligning rail structures of the second platform further includes:

moving a transfer fixture of the second platform, the rail structures fixably coupled to the transfer fixture.

17. The method of claim 16 wherein the transfer fixture includes a sliding plate.

18. The method of claim 16 wherein the moving the transfer fixture includes providing a force on the transfer fixture with an alignment wrench.

19. The method of claim 18 wherein the transfer fixture includes a sliding plate, wherein the providing a force on the transfer fixture further includes pivoting the alignment wrench with respect to a platform substructure of the second platform to provide a force on an edge of the sliding plate.

* * * * *